United States Patent Office 3,642,853
Patented Feb. 15, 1972

3,642,853
SYNTHESIS OF ALUMINUM HYDRIDE AND TERTIARY AMINE ADDUCTS THEREOF
Jawad H. Murib and David Horvitz, Cincinnati, Ohio, assignors to National Distillers and Chemical Corporation, New York, N.Y.
No Drawing. Filed Dec. 18, 1968, Ser. No. 784,881
Int. Cl. C01b 6/06; C07f 5/06
U.S. Cl. 260—448                               35 Claims

ABSTRACT OF THE DISCLOSURE

A process is provided for the stepwise preparation of aluminum hydride and its tertiary amine adducts by (1) synthesizing the trimethylamine-alane adduct from aluminum, hydrogen and trimethylamine in the presence of a Group I–A or Group II–A metal catalyst,
(2) transaminating the trimethylamine-alane adduct with another tertiary amine to form another tertiary amine-alane adduct, and
(3) thermally decomposing the tertiary amine-alane adduct in the presence of a Group I–A or Group II–A metal hydride or organometallic compound catalyst to form alane and the tertiary amine.

A process is also provided for synthesizing relatively stable tertiary amine-alane adducts from aluminum, hydrogen and the corresponding tertiary amine in the presence of a Group I–A or Group II–A metal catalyst.

This invention relates to a process for the preparation of aluminum hydride and its tertiary amine adducts and more specifically to the preparation of aluminum hydride by the stepwise synthesis of its tertiary amine adducts from elemental aluminum, hydrogen and a tertiary amine.

THE PRIOR ART

Aluminum hydride, or alane, and its tertiary amine adducts have long been known, but the methods for preparing these materials are inefficient and require expensive reactants. The preparation of the tertiary amine-alane adducts generally start from metal hydride and metal halide reactants, such as NaH, $LiAlH_4$, $AlCl_3$, and $N(CH_3)_3 \cdot HCl$.

Thus, Brendel et al. in U.S. Pat. No. 3,326,955 disclose a series of reactions for preparing tertiary amine complexes of aluminum hydride by the reaction of an alkali metal hydride, an aluminum trihalide and a trialkyl amine in the presence of an alkyl aluminum catalyst.

The laboratory processes are even more expensive and complex. Some are set forth by Ruff and Hawthorne, J. Amer. Chem. Soc., 82, 2142–2144 (1960). One process involves the reaction of lithium aluminum hydride plus a tertiary amine hydrochloride, i.e, $R_3N \cdot HCl$, in an ether medium at temperatures of from $-30°$ C. to $25°$ C.

Ruff and Hawthorne in J. Amer. Chem. Soc. 83, 535–538 (1961) describe the preparation of bis-trimethylamine-alane adduct by the reaction of trimethylamine with various trialkylamine-alane adducts evidently in stoichiometric proportions, at room temperature displacing the trialkylamine. The trialkylamine-alane adducts were prepared by the above-described method. The authors further state that the reaction of a trialkylamine with trimethylamine-alane adduct results in a mixed bis(trialkylamine) (trimethylamine)-alane adduct. They indicate that trimethylamine is not displaced from the adduct by trialkylamine because the bis(trialkylamine)(trimethylamine)-alane adduct is more stable than the trialkyl amine adducts. The authors indicate that reacting trimethylamine-alane adduct with a tertiary amine containing two methyl substituents, i.e., dimethyl allylamine, does result in at least a partial displacement of the trimethylamine from the adduct.

Tertiary polyamine-alane adducts which have two methyl substitutents on each nitrogen atom, apparently form an unusually stable structure, in adducts with alane. These adducts have been produced by the reaction of tertiary (N,N-dimethyl) polyamines with trimethylamine-alane in which trimethylamine is displaced. Adducts of these polyamines, as well as of other tertiary dimethylamines, are also apparently as stable as trimethylamine adducts. The tertiary amines forming less stable alane adducts were not recognized as being capable of replacing, in a transamination reaction, amines from the more stable amine-alane adducts. See Ruff and Hawthorne, J. Amer. Chem. Soc., 82, 5506 (1960); Fetter and Moore, Can. J. Chem., 42, 885–92 (1964); and Young and Ehrlich, Inorg. Chem., 4, 1358–60 (1961).

Another method of forming alane and its adducts is set out in U.S. Pat. No. 2,680,059 to Bragdon. Bragdon suggests generating aluminum hydride by the reaction of lithium hydride with aluminum trichloride and then complexing of the aluminum hydride with a tertiary amine in diethyl ether.

Each of these methods requires the initial preparation of a metal hydride or complex metal hydride, which is an extremely expensive reactant.

The method disclosed by Ashby in U.S. Pat. No. 3,159,626 does not require the preparation of a metal hydride, but is limited, however, to the preparation of a specific tertiary amine-alane adduct, triethylene diamine alane.

The Ashby material, which is a cyclic tertiary amine, has the unfortunate characteristic (described by Ashby in a later U.S. patent, No. 3,344,079) that it is entirely insoluble in hydrocarbons, ethers and other non-aqueous solvents and is thermally stable stable at temperatures greater than $200°$ C. Further, in the presence of water it decomposes, releasing active hydrogen, Accordingly, it cannot be dissolved by any known solvents and therefore is generally not as useful for metal plating as, for example, trimethylamine-alane.

In his later U.S. patent, No. 3,344,079 Ashby discloses an amine-alane-type composition. The composition is prepared by a process comprising the pressure hydrogenation of aluminum and N,N,N',N' - tetramethylethylene diamine. The composition is not a true tertiary amine-alane adduct; rather, as Ashby describes it, it is a complex of hydrogen and aluminum with N,N,N',N'-tetramethylethylene diamine. The molar ratio of aluminum to hydrogen is not the 1:3 of alane but rather 1:1.1. Such a compound cannot be utilized for the preparation of alane nor does it otherwise react in a manner identical to that of the true alane derivative.

STATEMENT OF THE INVENTION

Accordingly, this invention provides an efficient method for preparing an aluminum hydride-tertiary amine adduct, without having to first prepare another metal hydride. The present invention provides processes for the preparation of alane and its derivatives without the initial preparation of another metal hydride, utilizing as the reactants elemental aluminum and hydrogen plus a tertiary amine.

In the process of this invention a relatively stable tertiary amine-alane adduct (which in the case of trimethylamine at least, is not readily thermally decomposed) is produced, by the reaction of elemental aluminum plus hydrogen plus the corresponding tertiary amine in the presence of a Group I-A or Group II-A metal catalyst.

The process of this invention further provides a process for the preparation of other preferably more readily decomposable tertiary amine-alane adducts by a transamination reaction in which a tertiary amine capable of forming a less stable adduct with alane displaces a tertiary amine and especially trimethylamine, in any tertiary amine-alane adduct (such as is formed above) which is not as readily thermally decomposed and which will undergo the transamination to form the corresponding less stable tertiary amine-alane adduct, and the displaced tertiary amine, such as trimethylamine. By readily thermally decomposed is meant an adduct that can be decomposed thermally, alone or in the presence of a catalyst, as in step III, into the corresponding tertiary amine and alane.

The process of this invention further provides for a stepwise synthesis of pure aluminum hydride, or alane, where the aluminum and hydrogen comprising the alane are obtained from elemental aluminum and hydrogen. This stepwise synthesis includes as step I, forming a relatively stable tertiary amine adduct such as the trimethylamine-alane adduct as described above; as step II displacing tertiary amine, e.g. trimethylamine, from the relatively stable tertiary amine-alane adduct with another tertiary amine capable of forming a preferably more readily thermally decomposable tertiary amine-alane adduct; and as step III, thermally decomposing the tertiary amine-alane adduct product of step II, which has a decomposition temperature below the decomposition temperature of pure alane, in the presence of a Group I-A or Group II-A metal hydride or organometallic catalyst, to form as products pure alane and the corresponding tertiary amine, and separating alane product from the tertiary amine byproduct and catalyst.

Since all of the reagents except aluminum and hydrogen in the three-step process for the preparation of pure alane are recovered by the use of suitable recycling, the overall reaction is equivalent to the preparation of alane from aluminum and hydrogen. The reactions that take place are as follows, using trimethylamine as the first stage amine reactant:

(I)

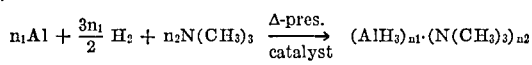

(II)

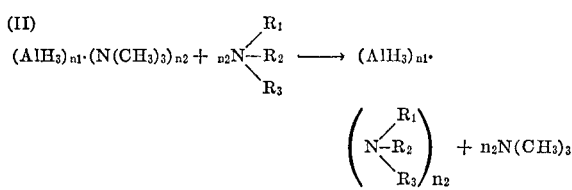

(III)

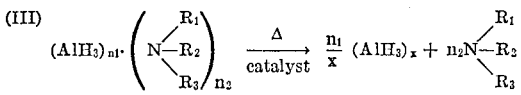

Overall reaction:

(IV)

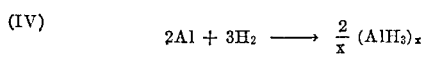

These reactions thus are combined in the process of the invention, to form the following cyclic process:

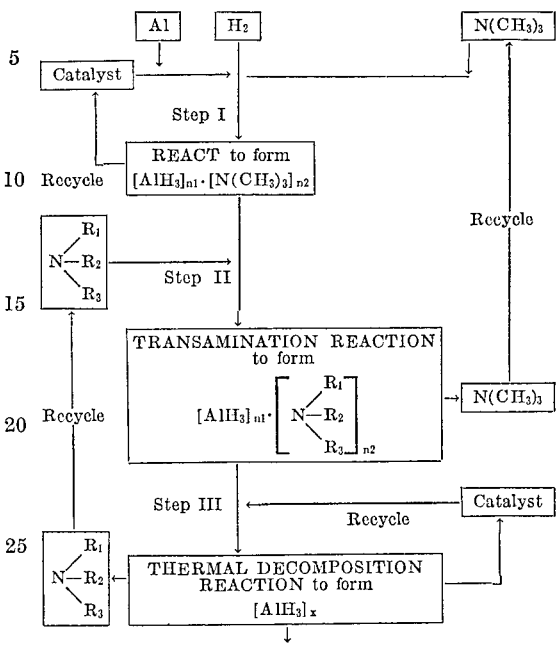

In the above outline, $n_1$, $n_2$ and $x$ are integers of one or more and the R groups are organic groups.

The trimethylamine used as a reactant in step I is recovered in step II, and can be recycled to step I. Similarly, the tertiary amine used in step II is recovered in step III and can be recycled to step II. Accordingly, the process of this invention provides a simple and efficient method for obtaining a pure aluminum hydride from relatively inexpensive starting materials.

DISCUSSION OF STEP I

Step I involves the pressure hydrogenation and amination of aluminum to produce a relatively stable tertiary amine-alane adduct.

A tertiary amine, preferably in solution in an inert liquid solvent medium, is reacted with hydrogen gas and elemental particulate aluminum, in the presence of a Group I-A or Group II-A metal catalyst. This reaction is carried out preferably with agitation, under an inert or reducing atmosphere to prevent decomposition and side reactions at an elevated pressure, usually within the range from about 1000 to about 15,000 lbs. per square inch, and preferably from about 2000 to about 10,000 lbs. per square inch, and at an elevated temperature but below the decomposition temperature of the tertiary amine-alane adduct product, usually in the range of from about 70° C. to about 200° C. The optimum temperature range is from about 80° C. to about 160° C.

The reaction is usually carried out in the temperature ranges set forth above only because they are most convenient and they are not to to be taken as limiting. The reaction does go forward at lower temperatures, but the rate is very slow, making the reaction inefficient. At temperatures above the cited range, care must be taken to avoid decomposition of the tertiary amine-alane adduct by increasing the proportion of hydrogen gas present, i.e. by increasing the pressure of hydrogen, and the proportion of tertiary amine reactant. Although pressure increases with temperature, given a constant volume reactor vessel, the increase due to temperature does not provide the additional proportion of hydrogen present. Accordingly, the minimum temperature is determined by the desired rate of reaction, and the maximum temperature is determined by the partial pressure of hydrogen and tertiary amine in the reaction zone. The higher hydrogen partial pressures tend to depress decomposition, and permit utilization of the more efficient higher temperatures to obtain high conversions at a high reaction rate.

The preferred and most readily available tertiary amine capable of forming a stable adduct is trimethylamine. Other tertiary amines such as pyridine, quinuclidine, quinoline, N-methyl ethylenimine, and pyrrolidine can also be used. Generally tertiary amines which form stable nondecomposable adducts with alane include those having not more than and preferably less than four carbon atoms per amine nitrogen atom, polyamines containing two methyl groups attached to each nitrogen atom and heterocyclic amines where the nitrogen is part of the ring and is linked by a double bond to an adjoining carbon atom which is preferably unsubstituted or substituted by a methyl group.

The aluminum metal and tertiary amine can be reacted with hydrogen while in an inert liquid solvent medium. Suitable inert media include aliphatic, aromatic and cycloaliphatic hydrocarbon, including pure hydrocarbons, e.g., n-pentane, n-hexane, 2,2-dimethylbutane, n-heptane, decane, cyclohexane, o- and m-xylene, benzene and toluene, as well as oxyethers such as diethyl ether, methyl ethyl ether, methyl propyl ether, di-n-propyl ether, methyl butyl ether, anisole, dioxane, tetrahydrofuran, dimethyl and diethyl ethers of ethylene glycols and of lower polyethylene glycols, such as diethylene glycol dimethyl ether. The aromatic hydrocarbon solvents are preferred.

Alternatively, the reaction of step I can be carried out without a solvent, in which case the tertiary amine is employed both as a reactant and as a reaction medium. Where an inert solvent is not employed, the tertiary amine is preferably employed in large excess. The use of excess tertiary amine also tends to push the reaction towards completion, favoring the complete utilization of the more expensive aluminum metal, and tending to suppress the reverse decomposition reaction of the tertiary amine-alane adduct.

The catalysts which can be used for the reaction of step I have the empirical formula:

$$M[(M'R_{3-n}R'_n)_xR'']_y$$

wherein $x$ is zero or one,
$M'$ is aluminum or boron,
$n$ is zero, one or two
$M$ is a Group I-A or Group II-A metal, such as an alkali metal or an alkaline earth metal
$y$ is equal to the valence of the metal $M$, and can be zero, one or two,
$R$, $R'$ and $R''$ are hydrogen or saturated hydrocarbon or aromatic hydrocarbon, and can be the same or different.

Such catalysts include alkali or alkaline earth metal hydrides or complexes thereof with aluminum hydride or hydrocarbon aluminum compounds. Elemental alkali metals or alkaline earth metals can also be used, i.e. in this case $x$ and $y$ in the above formula are both zero.

Generally, it is believed that where the elemental alkali metals or alkaline earth metals or the simple alkali metal or alkaline earth metal hydrides or organo-metallic compounds are added to the reaction mixture, the corresponding aluminum hydride complex $M((AlH_3)_xR')_y$ is formed in situ during the course of the reaction. The metal first reacts with the hydrogen present to form the corresponding metal hydride, which then reacts with the aluminum and hydrogen, or aluminum hydride, to form the complex hydride.

For example, if sodium metal is added, the sodium will react with the hydrogen to form sodium hydride and then in turn react with aluminum and hydrogen or aluminum hydride to form sodium aluminum tetrahydride, i.e. $NaAlH_4$. Similarly, if the simple metal hydride is added this will react with aluminum and hydrogen or aluminum hydride to form the complex hydride.

The catalyst can also be added as a mixture of the alkali or alkaline earth metal or alkali or alkaline earth metal hydride plus preformed aluminum hydride or aluminum organometallic compound, e.g. lithium hydride plus aluminum triethyl.

The Group I-A and Group II-A metals (for $M$) include lithium, sodium, potassium, rubidium, cesium, magnesium, calcium, barium and strontium.

The $R$, $R'$ and $R''$ organic groups preferably have up to about ten carbon atoms and include alkyl groups such as methyl, ethyl, propyl, isopropyl, t-butyl, isobutyl, hexyl, nonyl, and isoamyl; cycloaliphatic groups such as cyclohexyl, cycloheptyl, cyclooctyl and methylcyclopentyl; and aromatic groups such as phenyl, alkaryl groups, such as tolyl, o-xylyl, n-butylphenyl, o-methylethylphenyl, and ethylphenyl and aralkyl groups such as phenethyl, phenpropyl, and p-ethylphenethyl.

Examples of useful catalysts include sodium metal, potassium metal, lithium metal, calcium metal, barium metal, cesium metal, $LiAlH(CH_3)_3$, $LiAlH_2(C_2H_5)_2$, $$NaAlH(CH_3)_3, NaAlH_2(C_3H_7)_2, Ca(AlH(CH_3)_3)_2$$

$LiAl(CH_3)_4$, $Ca(AlH_2(C_2H_5)_2)_2$, lithium aluminum hydride ($LiAlH_4$), lithium hydride, magnesium aluminum hydride, magnesium hydride, cesium hydride, sodium hydride, potassium hydride, calcium hydride, sodium aluminum hydride, potassium aluminum hydride, cesium aluminum hydride, calcium aluminum hydride, strontium aluminum hydride, methyl lithium, methyl lithium aluminum trihydride, butyl lithium, phenyl sodium, ethyl lithium, phenyl sodium aluminum trihydride, diethyl magnesium, ethyl potassium, magnesium bis(ethyl aluminum trihydride), butyl cesium, tetraethyl lithium aluminum, phenyl potassium, sodium borohydride, lithium borohydride, calcium borohydride, magnesium borohydride, cesium borohydride, ethyl lithium borohydride and triethyl aluminum sodium hydride. The preferred complex or double metal catalyst compounds are complexes of an alkali or alkaline earth metal hydride with either trialkyl aluminum or dialkyl aluminum hydride. Generally, the tertiary amine adducts of these metal hydrides can be used and they are included within the term "hydride."

It has been found that the use of aluminum hydride or organoaluminum compounds alone, i.e. $AlR_3$, wherein $R$ is as defined above, does not result in the desired product. The presence of an alkali or alkaline earth metal or its corresponding compounds is necessary.

The process of step I is heterogeneous, and therefore vigorous agitation is desirable in order to provide the most efficient contact among the reactants. Generally, agitation in the presence of small stainless steel balls, or other hard, particulate inert materials, which serve to remove the top reacted surface of the aluminum metal, provides fresh elemental aluminum surface on a continuous basis and thereby permits utilization of the metallic aluminum in comminuted form without prior activation.

Because of the heterogeneous nature of the reaction, to obtain the greatest possible surface area, particulate aluminum should be used. Although particulate aluminum of any size is useful, including flake, powder and atomized aluminum, or even large chunks of aluminum, preferably particulate aluminum of from 1 to about 20 mesh maximum size appear to provide the best combination of high surface area and ease of handling.

It is unnecessary to activate the aluminum surface with aluminum hydride or aluminum trialkyl compound, as described in U.S. Pat. No. 2,885,314 to Redman. However, such activation could be used, if desired, to increase the initial rate of reaction.

Generally, the reaction time for the step I hydrogenation reaction is from about five to about twenty-five hours, the rate of reaction depending upon conditions of temperature and pressure, and other factors, such as particle size of aluminum used and the catalyst.

The alane-tertiary amine adduct can readily be separated from the reaction mixture by first distilling off the amine and then isolating the product, which is dissolved in the remaining solvent, by either filtration to remove the solid materials followed by crystallization of the adduct from the solvent upon cooling, or by complete removal of the solvent by distillation followed by sublimation of the alane-tertiary amine product under vacuum from the solid material. The solid contains catalyst and unreacted elemental aluminum. In a commercial process, the catalyst, any unreacted aluminum metal, the unreacted tertiary amine and the solvent, if any, can be recycled back to the reaction zone.

The alane-tertiary amine adduct prepared according to step I above is useful as a reducing agent, as a hydrogen gas source and as a source of aluminum in aluminum plating to produce exceptionally pure aluminum coatings, see British Pat. No. 915,385.

However, in accordance with the process of this invention, the aluminum hydride-tertiary amine adduct is preferably used in the second, or transamination step of the process for the preparation of a different alane-tertiary amine adduct, preferably one which can be readily thermally decomposed to form pure alane.

DISCUSSION OF STEP II

The transamination step of the invention provides for the displacement of the first tertiary amine from the relatively stable amine-alane adduct formed in step I by a second tertiary amine to form a relatively less thermally stable amine-alane adduct plus the first tertiary amine. As this transamination is reversible, the first tertiary amine should be removed from the system as it is formed at a rate sufficient to permit the reaction to proceed in the desired direction and an excess of the transaminating tertiary amine should be used. The transaminating amine can be added to the first tertiary amine-alane adduct as a pure liquid, in the vapor phase, or dissolved in an inert liquid solvent.

The reaction of step II is preferably carried out in solution in an inert liquid diluent, such as any of the inert liquid solvents listed above for step I. The diluent should be inert to the reactants and the end product adduct, as well as to aluminum hydride; it should be liquid under the process conditions and it should be readily separable from the product either by distillation or by dissolution in a volatile solvent, i.e. solvent extraction. If desired, an excess of the tertiary amine can be used as a reaction medium. In addition, oxygen ethers, such as dialkylethers, such as diethyl ether and diisopropyl ether, di-n-propyl ether, dibutyl ether; alkylaryl ethers such as anisole and ethyl phenyl ether can be used as the inert reaction medium.

The transamination of step II is carried out at temperatures below the decomposition temperature of the tertiary amine-alane adduct product. Generally, the reaction is carried out at a temperature in the range of from about 35° C. to 90° C., to obtain an efficient rate for the transamination reaction, and optimally at a temperature in the range of from about 50° C. to about 75° C.

The transamination can be carried out under vacuum or under an inert gas atmosphere, and/or under solvent vapor. However, preferably the reaction zone is maintained at a pressure above atmospheric by an inert gas, such as nitrogen, or argon, which acts to seal out atmospheric oxygen and moisture. Preferably the first tertiary amine from the adduct reactant is volatile; optimally it is more volatile than the second transaminating tertiary amine. If the inert gas is fed through the reaction zone as the reaction proceeds, it acts as a sweep to remove the first tertiary amine from the reaction zone as it is formed. When the reaction is carried out under vacuum, the tertiary amine that is formed is also distilled off and withdrawn. When the first tertiary amine is more volatile than other tertiary amines, the pressure and temperature of the reaction are to maintain the liberated amine in the vapor phase, so that it can be swept out by the sweep gas or withdrawn by vacuum, and to maintain the other components, including the reactant second tertiary amine, in the liquid phase. For this reason, trimethylamine-alane adduct is the most preferred first tertiary amine-alane adduct.

Preferably, the transaminating amine forms a tertiary amine-alane adduct which is more readily thermally dissociated into pure alane than the starting adduct. Such tertiary amines have at least four and preferably at least six carbon atoms per amine nitrogen, and preferably do not contain more than one methyl substituent per nitrogen atom.

Generally, the preferred group of stable tertiary amine-alane adducts for use as a reactant in step II are the adducts of tertiary amines, containing not more than four carbon atoms per amino nitrogen atom, of amines containing at least two methyl substituents attached to each amino nitrogen atom, and of unsaturated heterocyclic amines wherein the nitrogen atom is linked through a double bond to a carbon atom which is unsubstituted or substituted by not more than one carbon atom. Examples of these compounds are given above in the discussion of step I of the process.

The tertiary amine useful for the transamination process of step II can be selected from the trihydrocarbon amines, e.g. aliphatic amines, cycloaliphatic amines, and aromatic amines, such as the mixed amines, e.g. aromatic-aliphatic amines, cycloaliphatic-aliphatic amines, and heterocyclic amines.

The tertiary amines useful for the transamination process of this invention also include the adducts of nitrogen-containing heterocyclic amines, wherein the nitrogen atom is part of the heterocyclic ring. Preferably, where the nitrogen atom is connected by a double bond to a carbon atom, e.g. as in pyridine, that carbon atom should be substituted with an organic group containing at least two carbon atoms, e.g. 2-t-butyl pyridine.

The transaminating tertiary amines having one tertiary amine group have the formula:

wherein $R_1$, $R_2$ and $R_3$ are organic groups having a total of at least four up to about twenty-four carbon atoms per nitrogen atom and preferably not more than one R is a methyl group. In a most preferred embodiment, the organic groups each have more than one carbon atom each, and preferably from two to about twelve carbon atoms each. Any of $R_1$, $R_2$ and $R_3$ can be joined together to form a heterocyclic group including the nitrogen atom, such as in 2-t-butyl pyridine and N-ethyl piperidine. The organic groups of the amine should not contain an active hydrogen that is reactive with the catalyst or with alane. The R groups include the substituted and unsubstituted aliphatic groups, such as the alkyl groups, such as ethyl, n-propyl, isopropyl, n-pentyl, isobutyl, isopentyl, hexyl, isohexyl, 2-ethylbutyl, n-butyl, t-butyl, n-octyl, isooctyl, 2-ethylhexyl, dodecyl, decyl; aromatic groups such as phenyl, tolyl, benzyl, phenethyl, ethyl phenyl, propyl phenyl, and xylyl; and cycloaliphatic groups such as cyclohexyl, cyclopentyl, methyl cyclopentyl, and methyl cyclohexyl.

The tertiary amines useful for forming the above adducts include aromatic amines such as diethyl aniline, ethyl butyl aniline, dipropyl aniline; aliphatic amines such as methyl diethylamine, butyl diethyl amine, tripropylamine, triisopropylamine, ethyl dipropyl amine, triethyl amine, triamyl amine, triisoamyl amine, butyl di(isohexyl) amine, tributylamine, triisobutyl amine, dibutyl ethyl amine, heptyl dibutyl amine, propyl diethyl amine, and diethyl hexyl amine; and cycloalkyl amines, such as cyclohexyl methyl ethyl amine, cyclohexyl diethyl amine, cyclopentyl dipropyl amine, methylcyclohexyl methyl amine and cyclohexyl dipropyl amine. Examples of heterocyclic tertiary amines include N-methyl piperidine, N-ethyl piperidine, N-propyl piperidine, N-isopropyl piperidine, N-t-butyl piperidine, 2-propyl pyridine, and 2-isopropyl pyridine.

DISCUSSION OF STEP III

The third step of this process comprises the decomposition of the thermally decomposable tertiary amine-alane adduct in the presence of a catalyst to form pure alane. The adduct should decompose at a temperature below the decomposition temperature of the alane product. The tertiary amine has a total of at least four carbon atoms, preferably at least five carbon atoms and optimally at least six carbon atoms and includes the amines listed above for step II.

The process is carried out at a temperature above the decomposition temperature of the tertiary amine-alane adduct to form aluminum hydride and the corresponding tertiary amine, but below the decomposition temperature of aluminum hydride. It is preferred that the temperature be less than 90° C. Usually, the temperature is in the range from about 35° C. to about 90° C. At temperatures below 35° C., the rate of the decomposition reaction is extremely slow, but the process can be carried out at lower temperatures, if this is not a disadvantage. To prevent hydrolysis of the aluminum hydride, the reaction mixture should be anhydrous, and the system should be oxygen-free, such as under nitrogen or other inert gas.

To assist in driving the decomposition reaction to completion, at least one of the products should be removed from the reaction mixture, preferably as it is formed. The tertiary amine can be removed from the reaction zone by distillation, desirably under reduced pressure, so as to keep the reaction mixture at below 90° C. The amine also can be removed by sweeping with inert diluent or solvent vapors, or with an inert gas, such as nitrogen. A reduced pressure, if used, is not so low that the tertiary amine-alane adduct is volatilized at the temperature at which the reaction is carried out. Generally, pressures of from about $10^{-8}$ up to about 50 mm. of Hg are satisfactory. Reaction is complete when evolution of tertiary amine ceases.

The aluminum hydride can be washed with a nonsolvent for alane that is a solvent for the amine-alane adduct and also preferably for the catalyst separating the solid aluminum hydride residue, followed by vacuum drying of the residue to about $10^{-8}$ mm. Hg and at a temperature up to the decomposition temperature up to the decomposition temperature of the alane product, to remove the solvent and any other volatile impurities.

In order to facilitate the intimate admixture of the metal hydride catalyst and the tertiary amine-alane adduct, the materials are preferably mixed as slurries or solutions in an inert liquid or solvent medium. This liquid or solvent can be removed before decomposition of the adduct, if desired.

The same solvents listed above for use in the process of step I can be used in step III. The preferred solvents for this step, however, are the ethers and especially the lower aliphatic ethers, such as diethyl ether and methyl propyl ether.

The catalysts useful in the reaction of step III include Group I–A or Group II–A metal hydrides and organometallic compounds having the general formula $$M[(M'R_{3-n}R'_n)_xR''_n]_y$$

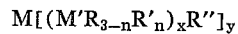

wherein M is an alkali or alkaline earth metal which are herein defined as including sodium, potassium, lithium, cesium, calcium, barium, magnesium and strontium; M' is aluminum or boron, R, R' and R'' are hydrogen or a saturated hydrocarbon group or an aromatic hydrocarbon group and can include mixtures thereof as defined above for the catalyst of step I, $x$ is zero or one and $y$ is a number equal to the valence of the metal M(1 or 2), $n=0$, 1 or 2. When $x$ is zero, the catalyst is a simple alkali or alkaline earth metal hydride or organometallic compound having the formula $MR''_y$ wherein M, R and $y$ are as defined above, or a mixture of, for example, aluminum hydride and an alkali or alkaline earth metal hydride or corresponding organometallic compounds. Preferably, the complex alkali or alkaline earth metal aluminum hydride catalysts are used. When a simple metal hydride or organometallic compound is used, it is believed that it reacts with the initial aluminum hydride product to form the complex aluminum hydride, e.g. LiAlH. The simple metal hydrides are generally insoluble in the solvents for the tertiary amine-alane adducts. However, the complex aluminum hydrides are soluble, and are preferred for this reason.

Examples of the metal hydride and organometallic catalysts set forth above for step I are also useful for the decompostion reaction of step III. Preferably, the alkali or alkaline earth metal aluminum hydride complexes are used for step III.

The reactions of each of the three steps, as described in reaction Equations I, II and III, are especially useful in combination to provide a single efficient and economical process for the preparation of a highly pure alane from elemental aluminum and hydrogen. In carrying out this process commercially, the relatively stable tertiary amine-alane adduct product of step I, e.g. trimethylamine-alane, is separated from the solid residue (i.e. the catalyst and aluminum metal) and is mixed with a second tertiary amine, following the conditions of step II. The second tertiary amine-alane adduct product of step II is separated from the first tertiary amine, e.g. trimethylamine, byproduct, which is recycled back to step I. The tertiary amine-alane adduct product of step II is then heated under the decomposition conditions described for the reaction of step III to form the desired alane. The tertiary amine byproduct of step III is separated and recycled for further use in Step II.

Certain catalysts which are utilized in the process of step I can be carried along through step II and into step III by the reaction medium. The same catalyst can then be used in the process of step III as in step I, and it does not interfere with the replacement of step II, if the temperature and pressure conditions are adjusted so as to minimize the decomposition of the tertiary amine-alane adduct product of step II. The catalyst carried through the reaction should be soluble in the reaction medium used in steps I and III so that it can be readily separated from the aluminum metal of step I and from the alane product of step III.

I this case, the second tertiary amine-alane adduct need not be removed from the reaction zone of step II. As soon as the exchange reaction of step II has been completed, and the first tertiary amine, e.g. trimethylamine, removed, the reactor can be swept clean of the excess tertiary amine reactant of step II by sweeping with an inert gas such as nitrogen or argon or by pumping out the reactant under vacuum, or both.

The temperature and pressure should then be adjusted to the conditions for the thermal decomposition of the tertiary amine-alane adduct in the presence of the catalyst retained from step I. It is important to insure that there is no elemental aluminum in the reaction zone before carrying out the thermal dissociation reaction of step III to avoid contaminating the alane product with an impurity that cannot be removed. Accordingly, in this process the product of step I should be carefully purified to remove any elemental aluminum.

The catalyst of step I is useful for the reaction of step III even if the elemental Group I–A metal or Group II–A metal was added. Although the elemental alkali or alkaline earth metals are not useful in the step III reaction, as explained above, if the metals had been added to step I they would have been converted in situ during the reaction of step I to the corresponding hydride, and probably into the corresponding complex with aluminum hydride. Such compounds are useful for step III.

Any catalyst which may have been carried along from step I through the process steps in the reaction medium with the tertiary amine-alane adducts is then separated from the alane product after the third step reaction by solvent extraction with a solvent such as ether or an aromatic hydrocarbon, depending on the catalyst used, which removes any undissociated tertiary amine-alane adduct reactant as well as the catalyst. The catalyst can then be recycled back to step I for further use and the undissociated tertiary amine-alane adduct recycled back to step III. Accordingly, such a process is very efficient. The only materials used up are the relatively inexpensive elemental aluminum and hydrogen. The remaining reactant materials, i.e. the tertiary amines and the Group I-A or Group II-A metal catalysts are continually recycled for reuse in the reaction.

Care must be taken during each of the above steps I, II and III, to avoid the presence of air or any moisture. Preferably the reactions are carried out under an inert gas blanket, or vacuum. Any transfer of the products from one step to the next should also be carried out under an inert gas blanket, so as to avoid contact with oxygen and to maintain the material substantially anhydrous.

THE EXAMPLES

The following are preferred embodiments of the processes of this invention:

EXAMPLE 1

A solution of sodium aluminum hydride triethyl catalyst $NaAlH(C_2H_5)_3$ in toluene was added to a charge of 2.5 g. of metallic aluminum (20 mesh powder) in a dried 150-ml. pressure reactor provided with 60 g. of 3/16-inch stainless steel balls. The reactor was filled with nitrogen at atmospheric pressure. The aluminum metal was not preactivated.

The catalyst was prepared by combining 0.12 g. of sodium hydride, 1 g. of heptane, 0.64 g. of triethyl aluminum and 24 g. of toluene, which reacted at room temperature to form the $NaAlH(C_2H_5)_3$.

The pressure reactor was cooled with a Dry Ice-acetone bath and evacuated through a vacuum line to a pressure of $10^{-5}$ mm. Hg. Trimethylamine (142.5 mmols) (3200 cc. gas at standard conditions) was then condensed into the aluminum-catalyst mixture at −78° C.

The reactor was then pressurized with hydrogen to 2000 p.s.i. and sealed, heated to 140° C., and agitated in a paint shaker at 140° C. for 15 hours. The reaction mixture was quenched by cooling to −78° C., and the hydrogen and any remaining trimethylamine were vented through a mercury bubbler. The reactor was then permitted to warm to room temperature while the reaction mixture was vacuum distilled. The volatile material was condensed in a cold trap at −78° C. The condensate included a crystalline solid which accumulated at the mouth of the cold trap. The crystalline solid was removed, permitted to warm up to room temperature, and dissolved in toluene.

The toluene solution of the crystalline solid was analyzed for aluminum hydride and trimethylamine. The hydride content was determined by hydrolysis with alcoholic potassium hydride, and measurement of the hydrogen gas evolved. The evolved hydrogen was measured by first passing the evolved gas through one cold trap cooled to −78° C., and then two subsequent traps cooled to −196° C., to remove any condensible vapors. The remaining incondensibles were then transferred to a system of calibrated bulbs via a Toepler pump where the gaseous hydrogen was measured.

The liquid hydrolysis mixture was vacuum distilled to dryness, condensing the volatile materials in the cold traps. The dry residue was then analyzed for aluminum by dissolution in dilute hydrochloric acid and determination of aluminum content by the 8-hydroxyquinoline method.

The vapor condensates in the cold traps from the hydrolysis mixture were combined and titrated potentiometrically with a standard solution of hydrochloric acid and isopropyl alcohol to determine the amount of tertiary amine present.

The results of the analysis showed that the toluene-soluble product had the ratio of Al:H of 1:2.93, which is in satisfactory agreement with the theoretical value of 1:3 for aluminum hydride-trimethylamine adduct. The mole-atom ratio of soluble trimethylamine to aluminum was 1.6:1, higher than the expected 1:1 ratio. This is believed to be due to the presence of a mixture of

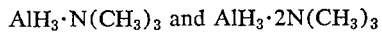

$$AlH_3 \cdot N(CH_3)_3 \text{ and } AlH_3 \cdot 2N(CH_3)_3$$

The amount of aluminum hydride prepared in the form of an adduct with trimethylamine was 25.3 mmols.

EXAMPLE 2

The process of Example 1 was repeated utilizing the following reactants: a catalyst mixture of calcium hydride (.05 g.) and triethyl aluminum (0.67 g.); 2.7 g. of aluminum and 3516 cc. (gas at standard conditions) of trimethylamine. The reactor was pressurized with hydrogen to 2100 p.s.i. while being maintained at −78° C. The reaction was carried out with agitation at 140° C. for 16 hours.

The product was separated and analyzed as in Example 1. Hydrolytic analysis disclosed the presence of 16.4 mmols of trimethylamine-alane adduct.

EXAMPLE 3

Example 2 was repeated but omitting the aluminum triethyl. The reaction was carried out at 120° C. for 24 hours. The product was separated and analyzed as in Example 2 and indicated the preparation of 23.5 mmols of trimethylamine-alane adduct. This corresponds to 23 mols of trimethylamine-alane produced per mole of calcium hydride catalyst employed.

EXAMPLE 4

Example 3 was repeated omitting the toluene solvent. In this example, a mixture of 2.7 g. of aluminum, 16.7 g. of trimethylamine and 0.12 g. of calcium hydride was heated at 100° C. under the hydrogen pressure used in Example 1. The excess of trimethylamine served as the reaction medium. Purification and analysis of the reaction product showed the preparation of 15.9 mmols of trimethylamine-alane adduct.

EXAMPLE 5

Example 4 was repeated except that the catalyst, $CaH_2$, was replaced by $Ca(HAlEt_3)_2$. The reaction provided trimethylamine-alane adduct in conversion of 50 mole percent based on the charge of aluminum.

EXAMPLE 6

The process of Example 1 was repeated using the following reactants: 2.7 g. aluminum, 0.2 g. sodium hydride suspended in 1.53 g. heptane, 0.36 g. triethyl aluminum dissolved in 1.34 g. toluene and 8.36 g. trimethylamine dissolved in 22.8 g. of tetrahydrofuran, the inert solvent medium.

The reactor was pressurized with hydrogen to 1915 p.s.i. while being maintained at −78° C. The reaction mixture was agitated for 16 hours after being heated to 160° C.

Purifiication and hydrolytic analysis of the reaction product as in Example 1 showed the preparation of 10.23 mmols of trimethylamine-alane adduct.

EXAMPLE 7

The process of Example 1 was repeated but omitting the triethyl aluminum. The charge to the reactor was as follows: 2.7 g. aluminum, 0.138 g. sodium hydride, 2.69 g. tetrahydrofuran, and 5860 cc. (gas at standard conditions) of trimethylamine. The reactor was pressurized with hydrogen to 1900 p.s.i. at −78° C. and the reaction was carried out with agitation at 140° C. for 16 hours. Purification and hydrolytic analysis of the reaction product as in Example 1 showed the preparation of 3.26 mmols trimethylamine-alane adduct.

EXAMPLE 8

The process of Example 1 was repeated but substituting lithium hydride for the sodium hydride. The reaction process, separation and analysis of the product as in Example 1 showed the production of soluble trimethylamine-alane adduct.

EXAMPLE 9

The process of this example utilizes the catalyst system and elemental aluminum retainded in the reactor as non-volatile residue after volatilization of the reaction mixture of Example 8. The reactor containing the residual catalyst and elementary aluminum was recharged with 20 ml. of toluene and 5860 cc. (gas at standard conditions) of trimethylamine, and repressurized with hydrogen to 2000 p.s.i. followed by heating at 140° C. overnight. Purification and hydrolytic analysis as in Example 8 again gave a volatile solid product identified as trimethylamine-alane.

EXAMPLE 10

The process of Example 1 is repeated but the catalyst is sodium aluminum hydride. Separation and analysis as in Example 1 shows the product to be trimethylamine-adduct.

EXAMPLE 11

The process of Example 1 is repeated but substituting aluminum diethyl hydride for aluminum triethyl so that the catalyst is $NaAl(C_2H_5)_2H_2$. The identical process is carried out and the product obtained is pure trimethylamine-alane.

EXAMPLE 12

The process of Example 1 is repeated, but substituting N-methyl ethylene imine for trimethylamine. The same process is carried out to produce pure N-methyl ethylene imine-alane adduct.

EXAMPLE 13

Example 1 is repeated but substituting 0.10 g. of barium metal as the catalyst instead of $NaHAl(C_2H_5)_3$. The reaction process, separation and analysis as in Example 1 resulted in 12.7 mmoles of trimethylamine-alane adduct.

EXAMPLE 14

The process of Example 1 is repeated, but substituting pyridine for trimethylamine. The same process is carried out to produce pure pyridine-alane adduct.

Comparative Example I

To show the effectiveness of using the alkali metal or alkaline earth metal catalyst according to the present invention, Example 1 was repeated in the absence of any alkali or alkaline earth metal catalyst. The reaction mixture consisted of 2.7 g. aluminum, 1.04 g. triethyl aluminum, 12.34 g. toluene and 3516 cc. (gas at standard conditions) of trimethylamine. The reactor vessel was pressurized with hydrogen to 1900 p.s.i. and heated at 140° C. with agitation for 17 hours. Processing and analysis of the reaction mixture as described in Example 1 failed to disclose the presence of any trimethylamine-alane adduct.

EXAMPLE 15

A diethyl ether solution (32.8 g.) containing 1.96 g. of the trimethylamine-alane obtained from Example 1 was placed in a 100 ml. round-bottom flask provided with a serum cap, a magnetic stirrer and a water condenser. The condenser was attached to a U-tube connected to a vacuum line. The ether was vacuum distilled off at −15° C. and condensed in the U-tube while the trimethylamine-alane was left as a white crystalline residue in the flask. The flask was permitted to warm up to a room temperature and 5.12 g. of triethylamine was then added. The reaction mixture was stirred for 4 hours while being heated at 65° C. and maintained at a pressure of 90 mm. Hg. The U-tube was maintained at −78° C.

The reaction flask was then cooled to 0° C. and vacuum distilled at $10^{-4}$ mm. Hg, i.e. under high vacuum, passing the volatile materials through traps cooled at −78° C. and −196° C.

The residue (1.76 g.) retained at 0° C., melted on warming to room temperature (triethylamine-alane adduct melts at 18–19° C.). The liquid product was subjected to alkaline hydrolysis and determination of hydrolytic hydrogen aluminum and triethylamine. The results of these analyses indicated that the residue was triethylamine-alane adduct. The observed ratio of Al:H:triethylamine was 1.00:2.93:1.04 which is in close agreement with the theoretical value 1:3:1, for triethylamine-alane adduct.

The condensate obtained in the −196° C. trap, consisted of 336 cc. (gas at standard conditions) of trimethylamine (15 mols) corresponding to a 68.2% conversion based on the original amount of the trimethylamine-alane adduct.

The −78° C. condensate contained the unconverted trimethylamine-alane adduct.

EXAMPLE 16

Another solution of 1.17 g. of the trimethylamine-alane from Example 1 was dissolved in 17.2 g. of diethyl ether and mixed with 3.91 g. of tri-n-propyl amine in a 100 ml. round-bottom flask provided with a fractionation column, a water condenser and a fraction splitter. The mixture was distilled at atmospheric pressure under a reflux ratio of 5:1, the material emanating from the water condenser was condensed and retained in a tray held at −78° C.

The distillation was continued for 2 hours during which time the reaction temperature was gradually raised to 62° C. and the pressure reduced to 5 mm. Hg as the ether was removed. After 2 additional hours of reaction time, the −78° C. condensate was refractionated through traps held at −78° C. and −196° C. The low temperature trap contained 4.47 mmols of trimethylamine, corresponding to a 33.8% conversion of the original trimethylamine-alane adduct to the tri-n-propylamine-alane adduct.

The reaction mixture in the flask was then vacuum distilled at room temperature under high vacuum ($10^{-4}$ mm. Hg) overnight, leaving a solid residue which was analyzed by hydrolytic analysis to determine the content of active hydride aluminum and tri-n-propyl amine and was shown to be the tri-n-propyl amine-alane adduct.

EXAMPLE 17

Example 14 is repeated but substituting n-methyl piperidine for the tri-n-propyl amine. Trimethylamine is obtained overhead and after purification, n-methyl piperidine-alane adduct is obtained.

EXAMPLE 18

Example 16 is repeated but substituting 2-ethyl pyridine for the tri-n-propylamine. The trimethylamine is obtained overhead and after purification 2-ethyl pyridine-alane adduct is obtained.

EXAMPLE 19

Example 16 is repeated but substituting diethyl aniline for the tri-n-propylamine. Trimethylamine is obtained overhead and after purification diethyl aniline-alane adduct is produced.

EXAMPLE 20

Example 16 is repeated, but substituting trihexylamine for the tri-n-propylamine. Trimethylamine is obtained overhead and after purification trihexylamine-alane adduct is isolated.

EXAMPLE 21

Example 16 is repeated, but substituting cyclohexyl diethylamine for the tri-n-propylamine. Substantially complete exchange with the trimethylamine is again obtained and after separation, cyclohexyl diethylamine-alane adduct is obtained.

EXAMPLE 22

The process according to Example 15 was repeated but substituting the pyridine alane adduct obtained from Example 14 for the trimethylamine-alane adduct. After removal of the ether solvent, tri-n-butylamine was added and the mixture heated. Pyridine is obtained overhead and pure tri-n-butylamine-alane adduct is obtained as the product.

EXAMPLE 23

A process for preparing aluminum hydride of high purity from elemental aluminum and hydrogen in three steps is carried out as follows: In the first step, a solution of trimethylamine-alane is prepared by the method of Example 1, above but substituting ether as the solvent and LiAlH$_4$ as the catalyst. The product is not vacuum distilled as in Example 1, after quenching the reaction mixture, but used as is. The reaction mixture is permitted to warm up to room temperature at normal pressure and the product is then filtered to remove any remaining solid residue, especially the elemental aluminum metal and the stainless steel balls.

The ether solution filtrate, which also contains the lithium hydride catalyst, is passed to a 150 ml. flask where it is mixed with 16 g. (0.15 mol) of triethylamine. The mixture is then heated to a temperature of 55° C. while sweeping with nitrogen gas at a pressure of 1000 mm. Hg.

Trimethylamine byproduct and ether are removed overhead with the nitrogen sweep gas, the trimethylamine and ether are condensed in a cold trap at —196° C. and returned to the first step for further reaction with elemental aluminum and hydrogen.

The resulting solution of lithium aluminum hydride catalyst in the liquid triethylamine-alane adduct is next heated to 75° C. to decompose the adduct. The sweep with nitrogen gas is continued to aid the removal of the triethylamine overhead. As the adduct decomposes, the solid alane precipitates out of the solution.

The triethylamine liberated during the decomposition of the triethylamine-alane adduct is condensed in the U-tube held at —78° C. and returned to the second stage for further reaction with additional trimethylamine-alane adduct. The remaining solid residue of alane in the reactor is heated to 90° C. at a high vacuum of 10$^{-4}$ mm. Hg for 10 minutes and again washed with diethyl ether to extract any remaining lithium aluminum hydride catalyst and any undissociated triethylamine-alane adduct. The solid product is alane of high purity obtained in a good conversion.

The solvent wash from the third stage alane product, which contains the catalyst, is recycled to the first stage and mixed with fresh trimethylamine, hydrogen and aluminum for further reaction.

Accordingly, in this process the only reactants which are used up are elemental aluminum and elemental hydrogen, the catalyst and the amines being recycled for continued use.

EXAMPLE 24

The three-step process of Example 2 is repeated but magnesium aluminum hydride is substituted for lithium aluminum hydride as the catalyst.

The solid product obtained is alane is high purity and in good yield.

EXAMPLE 25

The process for the preparation of the aluminum hydride from elemental aluminum and hydrogen in three steps was carried out as follows:

In the first step, 270 g. of aluminum, 8.38 g. of trimethylamine, 17.1 g. of toluene and 0.08 g. of calcium hydride were mixed in a 150 ml. pressure reactor containing 60 g. of $\frac{3}{16}$-inch stainless steel balls. The reactor was pressurized with hydrogen to 3420 p.s.i., sealed and then heated to 100° C., for 24 hours. The reactor was then cooled to Dry-Ice temperature and the excess hydrogen and the excess hydrogen and trimethylamine were vented through a mercury bubbler. The reaction mixture was distilled at room temperature condensing the distillate at —78° C. The distillate was warmed to room temperature and analyzed. It contained 36 mmoles of trimethylamine-alane dissolved in 16.9 g of toluene.

In step two, 15 g. sample of this toluene solution containing 32 mmoles of AlH$_3$:N(CH$_3$)$_3$ was treated with 5.1 g. of triethylamine. The resulting clear solution was distilled overnight at 62° C. and a pressure of 5 mm. Hg, condensing the distillate at —78° C. The —78° C. condensate contained trimethylamine and unreacted triethylamine dissolved in toluene. The —78° C. condensate was recycled to step I for further reaction with additional aluminum and hydrogen.

In step III, the pot residue from the distillation was then cooled to 0° C. and pumped at 10$^{-4}$ mm. Hg overnight. The liquid residue consisting of 2.18 g.

$$AlH_3:N(C_2H_5)_3$$

was mixed with lithium hydride (0.02 g.) suspended in 1 ml. of ether. The mixture was stirred and vacuum-heated at 76° C. for 2.5 hours under a pressure of 10 mm. Hg. Liberated triethylamine and ether were condensed overhead in a trap held at —78° C. The non-volatile residue was washed with ether and vacuum-dried at 58° C. to remove residual ether. Analysis of the insoluble white solid gave 10.3% H in close agreement with the theoretical content of 1°.0% H for AlH$_3$. The amount of residual lithium content was 0.09 wt. percent Li.

Having regard to the foregoing disclosure, the following is claimed as the inventive and patentable embodiments thereof:

1. A process for the preparation of a tertiary amine-alane adduct from elemental aluminum and hydrogen comprising reacting elemental aluminum, hydrogen and a first tertiary amine selected from the group consisting of trialkyl amines having no more than four carbon atoms, N-methyl ethylenimine, pyridine, quinoline and quinuclidine, at an elevated pressure above about 1000 p.s.i. and at an elevated temperature above about 70° C. but below the decomposition temperature of the adduct in the presence of a Group I–A or Group II–A metal catalyst having the formula M[M'R$_{3-n}$R'$_n$)$_x$R'')]$_y$, wherein M is a Group I–A or a Group II–A metal, M' is aluminum or boron, R, R' and R'' are each selected from the group consisting of hydrogen or saturated or aromatic hydrocarbon groups having up to about ten carbon atoms each, $n$ is zero, one or two, $x$ is zero or one, and $y$ is equal to the valence of the metal M, and can be zero, one or two, to form as a product a relatively thermally stable tertiary amine-alane adduct.

2. The process of claim 1 wherein the reaction is carried out under a hydrogen partial pressure in the range of from about 1000 to about 15,000 p.s.i.

3. The process of claim 2 wherein the reaction is carried out under a hydrogen partial pressure in the range of from about 2000 to about 10,000 p.s.i.

4. The process of claim 1 wherein the reaction is carried out at a temperature between about 70° C. and 200° C.

5. The process of claim 4 wherein the reaction is carried out at a temperature of from about 80° C. to 160° C.

6. The process of claim 1 wherein the aluminum is in the form of finely divided particulate aluminum.

7. The process of claim 6 wherein the aluminum has a particle size of from one to twenty mesh.

8. The process of claim 1 wherein the catalyst is $LiAlH_4$.

9. The process of claim 1 wherein the catalyst is $Mg(AlH_4)_2$.

10. The process of claim 1 wherein the catalyst is $LiHAl(C_2H_5)_3$.

11. The process of claim 1 wherein the catalyst is $NaHAl(C_2H_5)_3$.

12. The process of claim 1 wherein the catalyst is $Cr(HAl(C_2H_5)_3)_2$.

13. The process of claim 1 wherein the catalyst is LiH.

14. The process of claim 1 wherein the catalyst is NaH.

15. The process of claim 1 wherein the catalyst is $MgH_2$.

16. The process of claim 1 wherein the catalyst is $CaH_2$.

17. The process of claim 1 wherein the catalyst is Li.

18. The process of claim 1 wherein the catalyst is Na.

19. The process of claim 1 wherein the catalyst is Ba.

20. The process of claim 1 wherein the tertiary amine is trimethylamine.

21. The process of claim 20 wherein the aluminum and trimethylamine are mixed in an inert liquid reaction medium.

22. The process of claim 20 wherein the reaction is carried out in the presence of excess trimethylamine as a reaction medium.

23. The process of claim 1 wherein the relatively thermally stable first tertiary amine-alane adduct product is transaminated with a second tertiary amine selected from the group consisting of amines having more than four carbon atoms and having the formula:

wherein $R_1$, $R_2$ and $R_3$ are aliphatic hydrocarbon groups, cycloaliphatic hydrocarbon groups or aromatic groups, N-methyl piperidine, N-ethyl piperidine, N-propyl piperidene, N-isopropyl piperidine, N-t-butyl piperidine, 2-ethyl pyridine, 2-propyl pyridine and 2-isopropyl pyridine, to form the corresponding second tertiary amine-alane adduct and first tertiary amine, said transamination being carried out at a temperature below the decomposition temperature of said second tertiary amine-alane adduct, separating the first tertiary amine and the second tertiary amine-alane adduct and recycling the first tertiary amine for further reaction with aluminum and hydrogen in accordance with claim 1.

24. The process of claim 23 wherein the first tertiary amine-alane adduct is trimethylamine-alane.

25. A process for the preparation of aluminum hydride which comprises preparing a tertiary amine-alane adduct according to the process of claim 23, and then decomposing the tertiary amine-alane adduct in the presence of a metal hydride or organometallic catalyst having the formula $M[(M'R_{3-n}R'_n)_xR'']_y$, and tertiary amine adduct thereof, wherein M is a Group I–A metal or Group II–A metal, M' is aluminum or boron, the R, R' and R'' groups are each selected from the group consisting of hydrogen or saturated or aromatic hydrocarbon groups, having up to about ten carbon atoms, $n$ is zero, one or two, $x$ is zero or one, and $y$ is equal to the valence of the metal M and can be one or two, to form as a product aluminum hydride and the corresponding tertiary amine, separating the aluminum hydride and the tertiary amine and recycling the tertiary amine for further transamination with the first tertiary amine-alane adduct in accordance with claim 23.

26. A process for the preparation of a tertiary amine-alane adduct having a total of at least about five carbon atoms per amine nitrogen atom and wherein at most one substituent per amine nitrogen atom is a methyl group, comprising transaminating a first tertiary amine-alane adduct, wherein the first tertiary amine is selected from the group consisting of trialkyl amines having no more than four carbon atoms. N-methyl ethylenimine, pyridine, quinoline and quinuclidine, the first adduct being not readily thermally decomposable to the corresponding tertiary amine and alane, with an excess of a second tertiary amine selected from the group consisting of amines having more than four carbon atoms and having the formula:

wherein $R_1$, $R_2$ and $R_3$ are aliphatic hydrocarbon groups, cycloaliphatic hydrocarbon groups or aromatic groups, N-methyl piperidine, N-ethyl piperidine, N-propyl piperidene, N-isopropyl piperidine, N-t-butyl piperidine, 2-ethyl pyridine, 2-propyl pyridine and 2-isopropyl pyridine, to form as a product the corresponding second tertiary amine-alane adduct and first tertiary amine; said transamination step being carried out at a temperature below the decomposition temperature of said second tertiary amine-alane adduct, and separating the first tertiary amine from the second tertiary amine-alane adduct at a rate sufficient to permit the transamination to proceed.

27. The process of claim 26 wherein the first adduct is trimethylamine-alane and wherein the products are the second tertiary amine-alane adduct and free trimethylamine.

28. The process of claim 26 wherein the second tertiary amine is triethylamine.

29. The process of claim 26 wherein the second tertiary amine is tripropylamine.

30. A process for the preparation of aluminum hydried comprising (1) forming a tertiary amine-alane adduct according to the process of claim 26 and (2) decomposing the tertiary amine-alane adduct in the presence of a metal hydride or organometallic catalyst having the formula $M[(M'R_{3-n})_xR'']_y$, and tertiary amine adducts thereof, wherein M is a Group I–A metal or a Group II–A metal, M' is aluminium or boron, the R, R' and R'' groups are each selected from the group consisting of hydrogen or saturated or aromatic hydrocarbon groups having up to about ten carbon atoms, $n$ is zero, one or two, $x$ is zero or one, and $y$ is equal to the valence of the metal M and can be one or two, to form as a product aluminum hydride and the corresponding tertiary amine, separating the aluminum hydride and the tertiary amine and recycling the tertiary amine for further reaction with the first tertiary amine-alane adduct in accordance with claim 26.

31. A process for the preparation of aluminum hydride from elemental aluminum and hydrogen comprising (I) reacting elemental aluminum and hydrogen and trimethylamine in the presence of a Group of I–A metal or Group II–A metal catalyst having the formula

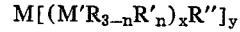

wherein the M is a Group I–A or Group II–A metal, M' is aluminum or boron, R, R' and R'' are each selected from the group consisting of hydrogen or saturated or aromatic hydrocarbon groups having up to about ten carbon atoms, each, $n$ is zero, one or two, $x$ is zero or one and $y$ is equal to the valence of the metal M and can be zero, one or two to form as a product a trimethylamine-alane adduct; (II) transaminating the trimethylamine-alane adduct from (I) with a second tertiary amine selected from the group consisting of amines having more than four carbon atoms and having the formula:

wherein $R_1$, $R_2$ and $R_3$ are aliphatic hydrocarbon groups, cycloaliphatic hydrocarbon groups or aromatic groups, N-methyl piperidine, N-ethyl piperidine, N-propyl piperidine, N-isopropyl piperidine, N-t-butyl piperidine, 2-ethyl pyridine, 2-propyl pyridine and 2-isopropyl pyridine, to form the corresponding second tertiary amine-alane adduct and free trimethylamine, said transmination step being carried out at a temperature below the decomposition temperature of said second tertiary amine-alane adduct, separating the trimethylamine and recycling the separated trimethylamine to (I), and (III) decomposing the tertiary amine-alane adduct in the presence of a catalyst having the formula $M[(M'R_{3-n}R'_n)_xR''] _y$, wherein M, M', R, R', R'', $n$, and $x$ are as set forth above, and $y$ is equal to the valence of the metal M and can be one or two, separating the aluminum hydride and the tertiary amine, and recycling the separated tertiary amine to (II).

32. A process according to claim 31 wherein the catalyst in step I is calcium hydride and in step III is lithium aluminum hydride, wherein step I is carried out at a temperature in the range of from about 80 to 160° C. and at a pressure of from about 2000 to about 10,000 p.s.i., wherein step II is carried out at a temperature of from about 50 to about 75° C., and wherein the tertiary amine is a triethylamine, wherein step III is carried out at a temperature of from about 35° to about 90° C. and at a pressure of from about $10^{-8}$ to about 50 mm. Hg.

33. A process according to claim 31 wherein step I is carried out at a temperature in the range of from about 86 to 160° C. and at a pressure of from about 2000 to about 10,000 p.s.i. and in a reaction medium wherein the catalyst dissolves to form a catalyst solution, wherein step II is carried out at a temperature of from about 50 to about 75° C., in the presence of the catalyst solution of step I, and wherein the tertiary amine is a triethylamine, wherein step III is carried out at a temperature of from about 35° to about 90° C. and at a pressure of from about $10^{-8}$ to about 50 mm. Hg in the presence of the catalyst solution from step II and the catalyst for step I and wherein the catalyst solution is recycled back to step I after being separated from the products of step III.

34. A process according to claim 33 wherein the catalyst is $NaHAl(C_2H_5)_3$.

35. A process according to claim 33 wherein the catalyst is $Ca(HAl(C_2H_5)_3)_2$.

References Cited

UNITED STATES PATENTS 3,159,626   12/1964   Ashby.
3,344,079   9/1967    Ashby.
3,326,955   6/1967    Brendel et al.

OTHER REFERENCES

Fetter et al.: Can. J. Chem., vol. 42, pp. 885–92 (1964).
Young et al.: Inorg. Chem., vol. 4, pp. 1358–60 (1961).

JAMES E. POER, Primary Examiner
H. M. S. SNEED, Assistant Examiner

U.S. Cl. X.R.
23—365; 260—270, 326.8